Nov. 9, 1926.
G. C. HOWARD
1,606,299
PROCESS OF PURIFYING AND CONCENTRATING SULPHUR DIOXIDE
Filed April 3, 1923
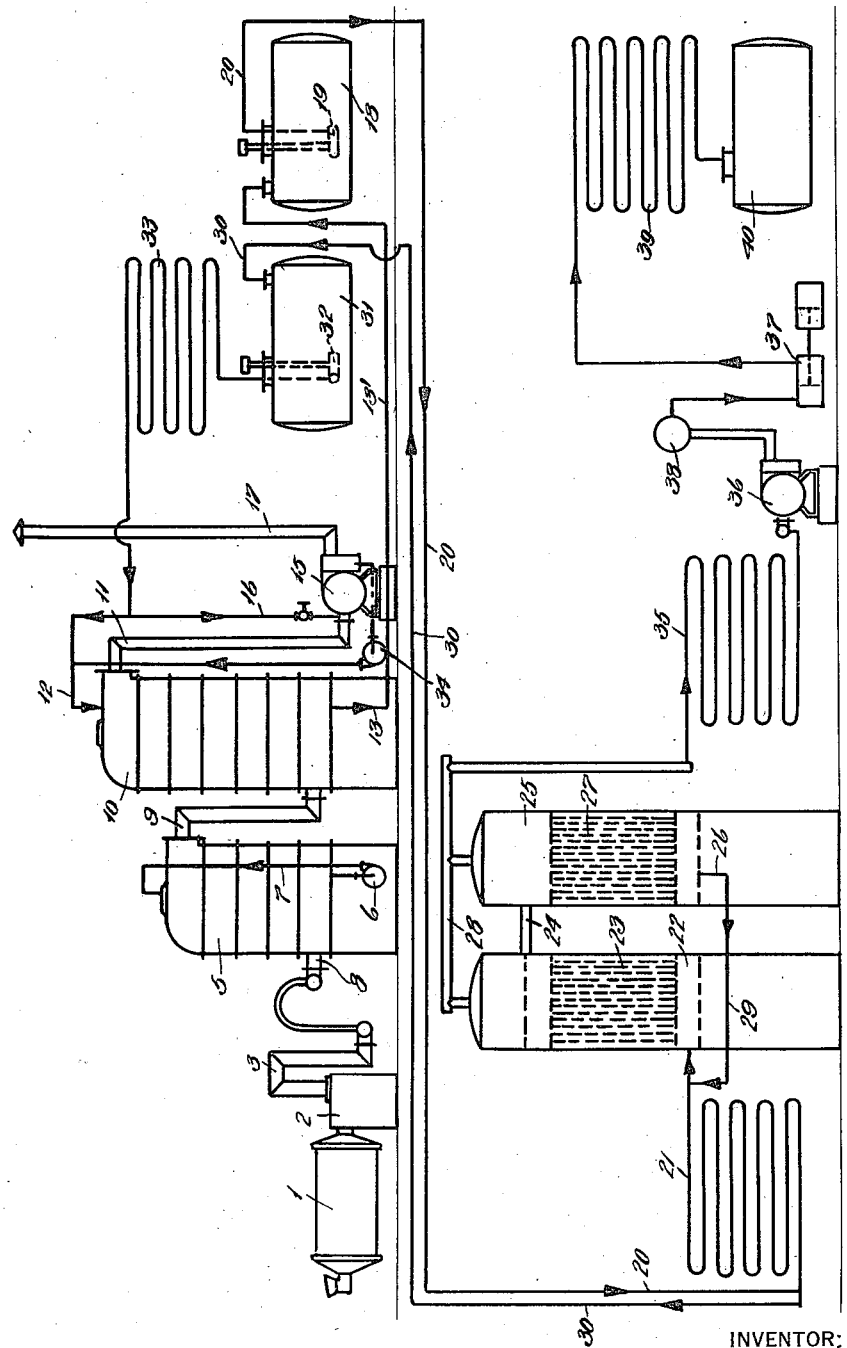
INVENTOR:
Guy C. Howard,
BY Pierre Barnes,
ATTORNEY.

Patented Nov. 9, 1926.

1,606,299

UNITED STATES PATENT OFFICE.

GUY C. HOWARD, OF SEATTLE, WASHINGTON.

PROCESS OF PURIFYING AND CONCENTRATING SULPHUR DIOXIDE.

Application filed April 3, 1923. Serial No. 629,602.

This invention relates to an improved process of making liquid sulphur dioxide.

The principal object of the invention is to provide an improved process for the manufacture of a pure and concentrated sulphur dioxide wherein an improved liquid absorbing medium is utilized for the separation of the sulphur dioxide from the original gas mixture.

Further objects of the invention reside in the successive steps of the process wherein the sulphur dioxide retained in solution by said absorption medium is freed therefrom and liquefied or rendered in suitable form for use.

The usual and well known process of making liquid sulphur dioxide consists essentially in absorbing the sulphur dioxide by means of cold water; heating this water solution to substantially its boiling point to expel the dissolved sulphur dioxide; cooling and drying the expelled sulphur dioxide gas and finally liquefying it by compression and refrigeration.

The cost of manufacture is determined primarily by the content of sulphur dioxide in the original gas mixture but the process is handicapped in several respects by reason of using water as the absorption medium. The quantity of water required is large and consequently the process involves a relatively high steam consumption; the sulphur dioxide expelled in the heating operation is saturated with water vapor which further complicates matters; sulphur dioxide in the presence of moisture is corrosive thus increasing the plant investment cost; and finally under normal conditions it is not economical to cool the spent liquor from the boiling tanks to a temperature suitable for reuse in the absorption towers, hence it is run to waste rather than being cycled thru the process.

My process involves particularly the employment of an improved absorption liquid for sulphur dioxide which will obviate the objectionable features inherent in the use of water and which has novel characteristics and economical advantages over other non-aqueous solvents that have been proposed.

The essential characteristics of a liquid to meet these requirements are: that it be non-aqueous and of suitably low viscosity; that its boiling point be higher than the boiling point of water and that its vapor tension be practically nil at the temperature at which the gases are absorbed; that it have a higher coefficient of absorption for sulphur dioxide than water has and that no chemical reactions take place with sulphur dioxide other than such as are reversible by heating in the absence of water; that the liquid is not decomposed or injuriously altered by repeatedly heating and cooling it to temperatures below its boiling point; that its specific heat be low; that it is non-corrosive on iron or steel; and finally that it be reasonable in cost and easily procurable.

The liquids best suited as an absorption medium for sulphur dioxide and meeting all the above requirements are found among the cyclic hydrocarbon compounds. Most of such compounds show a high coefficient of absorption for sulphur dioxide in comparison with water, but as regards reversibility of reaction in the absence of water to regenerate sulphur dioxide their behavior differs. The maximum partial pressure of sulphur dioxide in any gas mixture normally available for the process of this invention is 156 millimeters of mercury, and when exposed to sulphur dioxide at this partial pressure or lower these cyclic hydrocarbon compounds apparently react to form definite but perhaps hypothetical compounds which are in the nature of sulphonic and sulphinic acid combinations or both. It is to be understood such reactions do not proceed completely in that direction but simply to an equilibrium which is sufficient to account for the higher absorption properties in comparison with water. As a result of experiments I have found the reversibility of such reactions in the absence of water (thereby permitting of the regeneration of sulphur dioxide) relates to the presence or absence of hydroxyl (OH) groups in such cyclic hydrocarbon compounds. If monohydric or polyhydric phenols are present the coefficient of absorption of sulphur dioxide is high but only a portion of the sulphur dioxide is regenerated by heating in absence of water. On the other hand if phenols are absent the reaction is completely reversible by heating in the absence of water. The reason for this is that phenolic compounds react with sulphur dioxide either dry or in the presence of even a trace of water to form sulphonic acid combinations which do not reverse when heated in the absence of water but which will reverse when heated in the presence of sufficient steam. The hydrocarbons on the other hand which contain no hydroxyl groups react with sulphur dioxide either dry or even in the presence of water to form sulphinic acid combinations which reverse when heated in the absence of water. Since it is necessary in my invention to conduct the absorption of the sulphur dioxide by the absorption medium in the absence of water, and equally necessary to effect the regeneration of the sulphur dioxide by heating in the absence of water, the selection of the absorption medium may be limited to a non-aqueous liquid cyclic hydrocarbon compound substantially free from mono or polyhydric phenol constituents. Such compounds are perhaps best secured from the distillation of coal tar but are also available from other sources.

I would specifically omit from consideration as an absorption medium in this process any alcohols of the saturated hydrocarbon series such as methyl and the corresponding higher alcohols, as not complying with economic requirements for one reason or another. Also I would deny all claim to vegetable oils as not being compounds which show materially if any higher absorption for sulphur dioxide than water does, hence not meeting one of the objections of this invention. Finally I would not exclude anthracene and other of the higher solid hydrocarbons since their coefficient of absorption is sufficiently high to meet requirements and would limit the quantity of such constituents only by the amount which will remain in solution in the absorption medium at the temperatures obtaining throughout the cycle of operation and by economic reasons as regards cost.

My improved process may be described as follows, reference being had to the accompanying drawing which illustrates in somewhat diagrammatic form and shown on two elevations the apparatus employed in carrying out said process.

The reference numerical 1 designates a sulphur burner which typifies the source from which a sulphur dioxide mixture is obtained, and 2 is a combustion chamber, normally a part of such burner. 3 indicates a cooler whereby the gas mixture is cooled by air or water outside of the pipes. A cooling and scrubbing tower 5 is provided wherein the gas mixture is dried and cooled to the predetermined temperature for absorption and in which any flue dust, fume and other impurities can be removed. This is accomplished by circulating strong sulphuric acid through the tower 5 counter-current to the gaseous mixture. The circulation of acid in the tower 5 is accomplished by pump 6 through pipe 7, in which cycle is an acid storage tank and cooling coil, not shown, to remove the heat absorbed from the gas mixture.

The gas entering said tower 5 at 8 is discharged therefrom through pipe 9 into an absorption tower 10 in which the dried and cooled gas mixture enters at the bottom and passes upward counter current to the absorption liquor and passes out at the top through pipe 11. Said absorption liquor or medium is a non-aqueous liquor heretofore described which enters the absorption tower 10 at 12 and exits into pipe 13 saturated with sulphur dioxide. The waste gas from tower 10 passes through pipe 11 to a Nash pump 15 or equivalent, which serves to furnish draft on all the preceding equipment and to function as a final absorption appliance for the spent gases, wherein said gases are brought into contact with the absorption liquor conveyed to said pump by pipe 16 as will be hereinafter explained. From the pump 15 the residual gases free from sulphur dioxide go to waste through pipe 17.

13' is a pipe carrying the liquor saturated with sulphur dioxide from tower 10 to a storage tank 18. A pump 19 delivers this liquor thru pipe 20 to a double pipe heat interchanger 21 wherein it is heated preparatory to entering the bottom of boiling tank 22. Said tank 22 may be described as a modified vertical fire tube boiler in which the liquor passes upward inside the tubes 23 and is heated by steam outside the tubes. In tank 22 the gas-saturated liquid is heated to a point above the boiling point of water but preferably below its own boiling point whereby the escape and removal of the absorbed gases is readily effected, without accompanying vapors from the absorption liquor in undue quantities. Rising in the tank 22 the liquor overflows at 24 into a finishing tank 25 from which it exits at 26. The finishing tank 25 may likewise be illustrated as a vertical boiler but differs from tank 22 in that provision is made to distribute the liquor to the rim of the tubes 27 so that it flows down as a thin stream on the surface of each tube. In other words the tubes are not kept full of the liquor as in the tank 22 for the desired action in this tank is best secured with the liquor spread out over as large an area as practicable, and thereby causing an economically complete removal of the sulphur dioxide from the absorption liquor in the form of gas. Steam outside the tubes 27 maintains the temperature and if desired raises it.

In tanks 22 and 25 the dissolved sulphur dioxide gas is expelled and exits thru pipe 28. The hot spent liquor returns thru pipe 29 to the interchanger 21 wherein it serves to heat the incoming saturated liquor and then passes thru pipe 30 to a storage tank 31. Pump 32 delivers this spent liquor to cooling coils 33 wherein it is cooled by suitable means to the predetermined temperature for absorption and passes in part by pipe 12 to the tower 10 and in part by pipe 16 to the pump 15 and thence thru pump 34 to the absorption tower 10 wherein it is resaturated with sulphur dioxide and repeats the described cycle.

The sulphur dioxide expelled from the tanks 22 and 25 is dry and pure save that, it will contain a small amount of the vapor of the absorption liquor and a normal small component of gases other than sulphur dioxide. This sulphur dioxide passes thru pipes 28 to double pipe coils 35 or equivalent apparatus in which it is cooled and thence to a Nash pump 36 or equivalent. The function of pump 36 is to furnish suction, or vacuum if desired, in the boiling and finishing tanks and to remove the condensed vapor of the absorption liquor carried by the sulphur dioxide. The displacement liquor used in the Nash pump 36 will normally be the same as the absorption liquid used in tower 10 and will circulate thru a cycle not shown including a cooling coil. From pump 36 the gas passes to a compressor 37 thru a receiver 38 thence to refrigerating coils 39 and to a storage tank 40. Any gas not liquefied by said compressor 37 and the succeeding refrigeration may be returned to the original gas-mixture for passage again thru the absorption towers.

It will thus be seen that my process consists essentially in drying and cooling a gas mixture containing sulphur dioxide, absorbing the sulphur dioxide in said dried and cooled mixture in a non-aqueous liquid which has a boiling point higher than water, heating said saturated liquor to expel the absorbed gas to a temperature above the boiling point of water, but below its own boiling point, causing said hot liquor to spread out to give maximum surface exposure whereby the removal of the gas is aided, returning said hot spent liquor thru a heat interchanger wherein its heat is transferred to the incoming saturated liquor, thence further cooling said spent liquor by suitable means and again exposing it to the gas mixture for resaturation with sulphur dioxide, cooling and scrubbing the gases and vapors expelled from the above heated liquor, compressing and refrigerating said resulting gases whereby the sulphur dioxide is liquefied and returning the non-liquefied constituents to the original gas mixture for passage again thru the absorption liquor.

Having described my invention, what I claim is:

1. The process of recovering sulphur dioxide from a dry gas mixture, consisting in exposing said gas mixture to a non-aqueous liquid cyclic hydrocarbon free from mono and polyhydric phenols whereby compounds are formed that decompose with the liberation of sulphur dioxide on heating in the absence of water, removing said resulting liquid hydrocarbon from contact with the gas mixture and subjecting it to heat in the absence of water, recovering the sulphur dioxide thereby liberated and again exposing said liquid hydrocarbon after cooling to a similar aforesaid gas mixture.

2. The process of recovering sulphur dioxide from a dry gas mixture, consisting in exposing said gas mixture to a non-aqueous liquid cyclic hydrocarbon free from mono and polyhydric phenols whereby sulphinic acid compounds are formed that decompose with the liberation of sulphur dioxide on heating in the absence of water, removing said resulting liquid hydrocarbon from contact with the gas mixture and subjecting it to heat in the absence of water, recovering the sulphur dioxide thereby liberated and again exposing said liqud hydrocarbon after cooling to a similar aforesaid gas mixture.

3. The process of recovering sulphur dioxide from a dry gas mixture consisting in exposing said gas mixture to a non-aqueous liquid hydrocarbon derived from coal tar and free from mono and polyhydric phenols whereby compounds are formed that decompose with the liberation of sulphur dioxide on heating in the absence of water, removing said resulting liquid hydrocarbon from contact with the gas mixture and subjecting it to heat in the absence of water, recovering the sulphur dioxide thereby liberated and again exposing said liquid hydrocarbon after cooling to a similar aforesaid gas mixture.

4. The process of recovering sulphur dioxide from a dry gas mixture consisting in exposing said gas mixture to a non-aqueous liquid hydrocarbon derived from coal tar and free from mono and polyhydric phenols whereby sulphinic acid compounds are formed that decompose with the liberation of sulphur dioxide on heating in the absence of water, removing said resulting liquid hydrocarbon from contact with the gas mixture and subjecting it to heat in the absence of water, recovering the sulphur dioxide thereby liberated and again exposing said liquid hydrocarbon after cooling to a similar aforesaid gas mixture.

GUY C. HOWARD.